(12) United States Patent
George et al.

(10) Patent No.: US 9,152,949 B2
(45) Date of Patent: Oct. 6, 2015

(54) METHODS AND APPARATUS FOR IDENTIFYING SPAM EMAIL

(75) Inventors: David Alson George, Somers, NY (US); Raymond Byars Jennings, III, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1651 days.

(21) Appl. No.: 11/435,409

(22) Filed: May 17, 2006

(65) Prior Publication Data

US 2007/0271343 A1    Nov. 22, 2007

(51) Int. Cl.
*G06F 15/16* (2006.01)
*G06Q 10/10* (2012.01)
*H04L 12/58* (2006.01)

(52) U.S. Cl.
CPC .......... *G06Q 10/107* (2013.01); *H04L 12/5885* (2013.01); *H04L 51/34* (2013.01)

(58) Field of Classification Search
None
See application file for complete search history.

(56) References Cited

U.S. PATENT DOCUMENTS

| | | |
|---|---|---|
| 5,619,648 A | 4/1997 | Canale et al. |
| 6,052,709 A | 4/2000 | Paul |
| 6,321,267 B1 | 11/2001 | Donaldson |
| 6,330,590 B1 | 12/2001 | Cotten |
| 6,732,157 B1 | 5/2004 | Gordon et al. |
| 6,769,016 B2 | 7/2004 | Rothwell et al. |
| 6,965,919 B1 | 11/2005 | Woods et al. |
| 7,016,939 B1 | 3/2006 | Rothwell et al. |
| 2005/0015626 A1* | 1/2005 | Chasin .......................... 713/201 |
| 2005/0283519 A1* | 12/2005 | Turgeman et al. ............. 709/206 |
| 2006/0031298 A1* | 2/2006 | Hasegawa ..................... 709/206 |
| 2006/0068755 A1* | 3/2006 | Shraim et al. ................. 455/410 |
| 2006/0075500 A1* | 4/2006 | Bertman et al. ................. 726/24 |
| 2006/0200487 A1* | 9/2006 | Adelman et al. ............. 707/102 |
| 2006/0224677 A1* | 10/2006 | Ishikawa et al. ................ 709/206 |
| 2006/0253584 A1* | 11/2006 | Dixon et al. ................... 709/225 |
| 2007/0294352 A1* | 12/2007 | Shraim et al. ................. 709/206 |

\* cited by examiner

*Primary Examiner* — Karen Tang
(74) *Attorney, Agent, or Firm* — Preston J. Young; Ryan, Mason & Lewis, LLP

(57) ABSTRACT

Methods and apparatus of classifying received email are provided. At least one initial desirability scan is performed on a received email. When the received email passes the at least one initial desirability scan, it is determined if the received email comprises one or more browser-interpretable scripts. When the received email comprises one or more browser-interpretable scripts, a secondary desirability scan is performed on the received email as a function of the one or more browser-interpretable scripts. The received email is identified as undesirable email when the received email fails the at least one initial desirability scan, or the received email fails the secondary desirability scan. The received e-mail is identified as desirable email when the received email does not comprise one or more browser-interpretable scripts or the received email passes the secondary desirability scan.

28 Claims, 5 Drawing Sheets

METHODS AND APPARATUS FOR IDENTIFYING SPAM EMAIL

FIELD OF THE INVENTION

The present invention relates to email environments and, more particularly, to methods and apparatus for classifying received emails.

BACKGROUND OF THE INVENTION

Internet spam typically includes one or more unsolicited messages sent, or posted, as part of a larger collection of messages, all having substantially identical content. Spam, as used herein, refers to email spam. Perpetrators that generate and send such spam may harvest email addresses of prospective recipients from Usenet postings or web pages, obtain them from databases, or simply guess them by using common names and domains. By popular definition, spam occurs without the permission of the recipients.

Spam is a significant burden for recipients as well as those who support the networking infrastructures that provide email services. Spam is chiefly utilized to deliver unwanted advertisements. Spammers, or those sending spam, also send spam for other agendas, such as denial of service, for example through the clogging of an email inbox using excessive bandwidth or disk space. Additional agendas may also include politics or malicious pornography. While other spamming motives exist, the common characteristic despite motive is that unwanted email circumvents devised email defenses, causing much productivity loss and great annoyance.

Presently there is a plurality of spam identifying and filtering techniques. Such means and apparatus may be provided at the client (end-user) end, or imbedded in various other stages of email handling, such as a central server. A system or algorithm has not yet emerged that is capable of identifying all spam due to the multitude of factors spammers use to camouflage the email content. Generally, the camouflage consists of random content to thwart identification of a pattern of consistency from one spam email to the next. The subject, the body of text, and even the normally invisible hypertext content may differ slightly in each spam email. Mass mailings containing legitimate and repetitious content are conversely known as non-spam, and may include, for example, proxy notices, billings, and customer services notifications. Invariably, the spam contains an active link implemented as hypertext or a script-activated button for the purpose of user response.

Presently, common signatures of email spam are identified and continually manually added for handling new patterns of spam content, resulting in a vicious circle of spam and defender warfare, with screening provided at mail server and client levels in the hierarchy. However, conventional screenings are failing to identify root spammers, thus allowing the spam to continually clog a user's inbox.

SUMMARY OF THE INVENTION

The present invention provides techniques for filtering or classifying email, and more particularly, for separating undesirable or spam email from desirable email.

For example, in one aspect of the present invention, a method of classifying received email is provided. At least one initial desirability scan is performed on a received email. When the received email passes the at least one initial desirability scan, it is determined if the received email comprises one or more browser-interpretable scripts. When the received email comprises one or more browser-interpretable scripts, a secondary desirability scan is performed on the received email as a function of the one or more browser-interpretable scripts. The received email is identified as undesirable email when the received email fails the at least one initial desirability scan, or the received email fails the secondary desirability scan. The received e-mail is identified as desirable email when the received email does not comprise one or more browser-interpretable scripts or the received email passes the secondary desirability scan.

In additional embodiments of the present invention, an initial desirability scan is performed by identifying one or more uniform resource locators (URLs) in the received e-mail, and determining if the one or more URLs are associated with at least one of an undesirable domain name and an undesirable IP address. Further, a secondary desirability scan may be performed by simulating an invocation of each of the one or more browser-interpretable scripts, and determining if content exposed from each simulation is associated with at least one of an undesirable domain name and an undesirable IP address.

The embodiments of the present invention describe how to identify root domains of a spam email. Furthermore, such embodiments include means to determine the obvious invalidity of many entries thus eliminating manual adjustment to newly discovered patterns. The primary advantage is the increased acuity in identifying root spamming domains including new domains at an email server by removing the camouflage and determining the target domains despite scripting in the email content. This identification at the email server also helps to reduce the impact to system resources and mail clients.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for classification of received email for the purpose of filtering out spam email.

Figure 1:
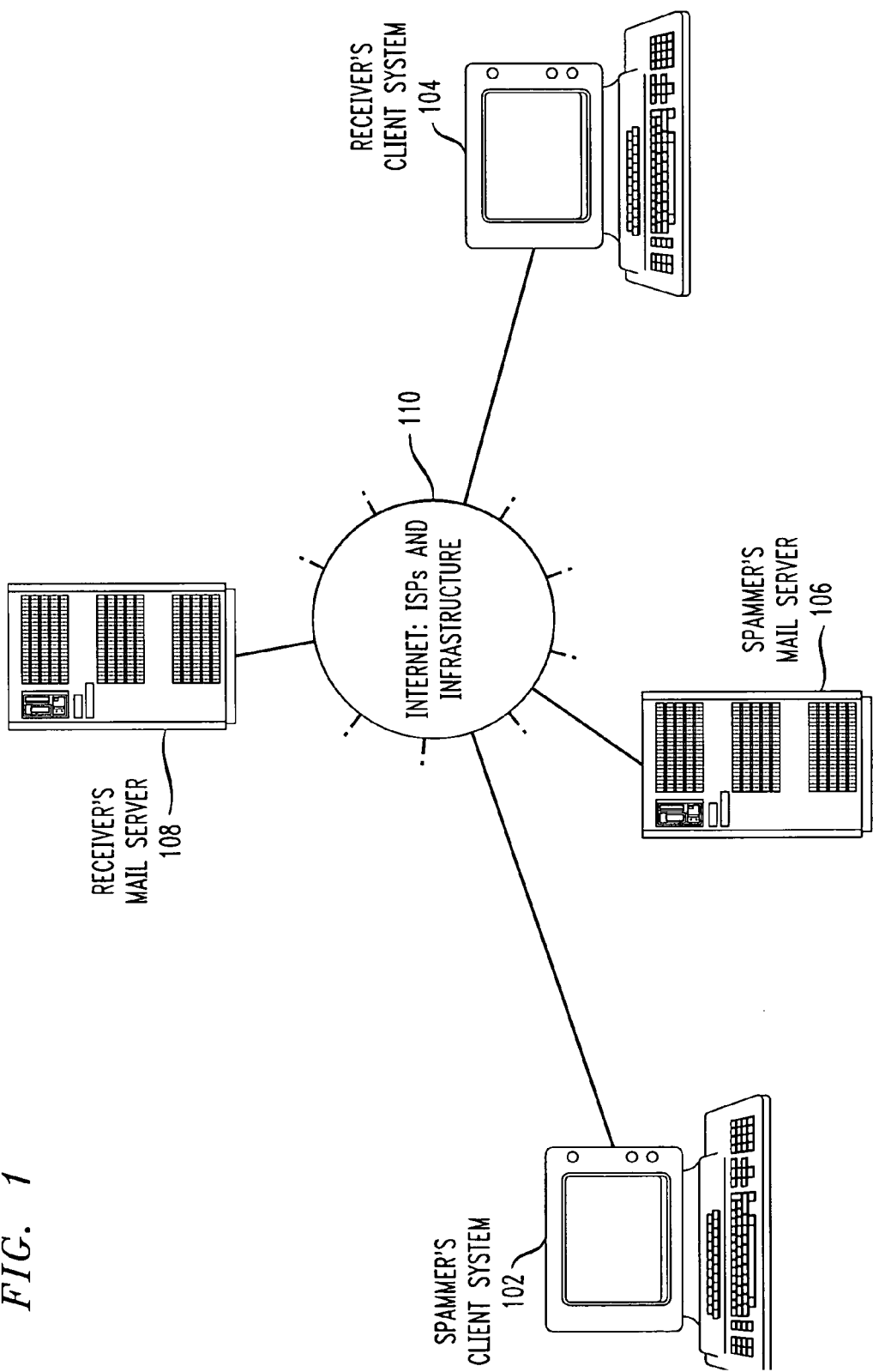
FIG. 1 is a diagram illustrating a network for identifying spam email, according to an embodiment of the present invention.

Referring initially to FIG. 1, a diagram illustrates a network for identifying spam email, according to an embodiment of the present invention. In the present environment, senders and receivers of email are facilitated by Internet connection services and infrastructure, and corresponding mail servers. In this environment, there is at least one spammer's client system 102 and at least one receiver's client system 104. Spammer's client system 102 may generate spam which can be distributed by a corresponding spammer's mail server 106, or may transmit packets which bypass spammer's mail server 106 because they conform to the proper content to be acceptable to a typical receiver's mail server 108. Thus, the embodiments of the present invention are not restricted by the spammer's adoption of a sending mail server.

The typical flow of spam is as follows: spam is generated at a spammer's client system 102, forwarded optionally to an intermediate spammer's mail server 106, via a network, such as, for example, the Internet 110. The email is forwarded to receiver's mail server 108 and subsequently retrieved by a receiver at receiver's client system 104. Receiver's mail server 108 may potentially identify some spam by deploying known spam email detection techniques. However, without embodiments of the present invention deployed at receiver's email server 108, cleverly disguised spam may not be detected, and consequently may be presented as inbound mail to the receiver at receiver's client system 104.

Figure 2:
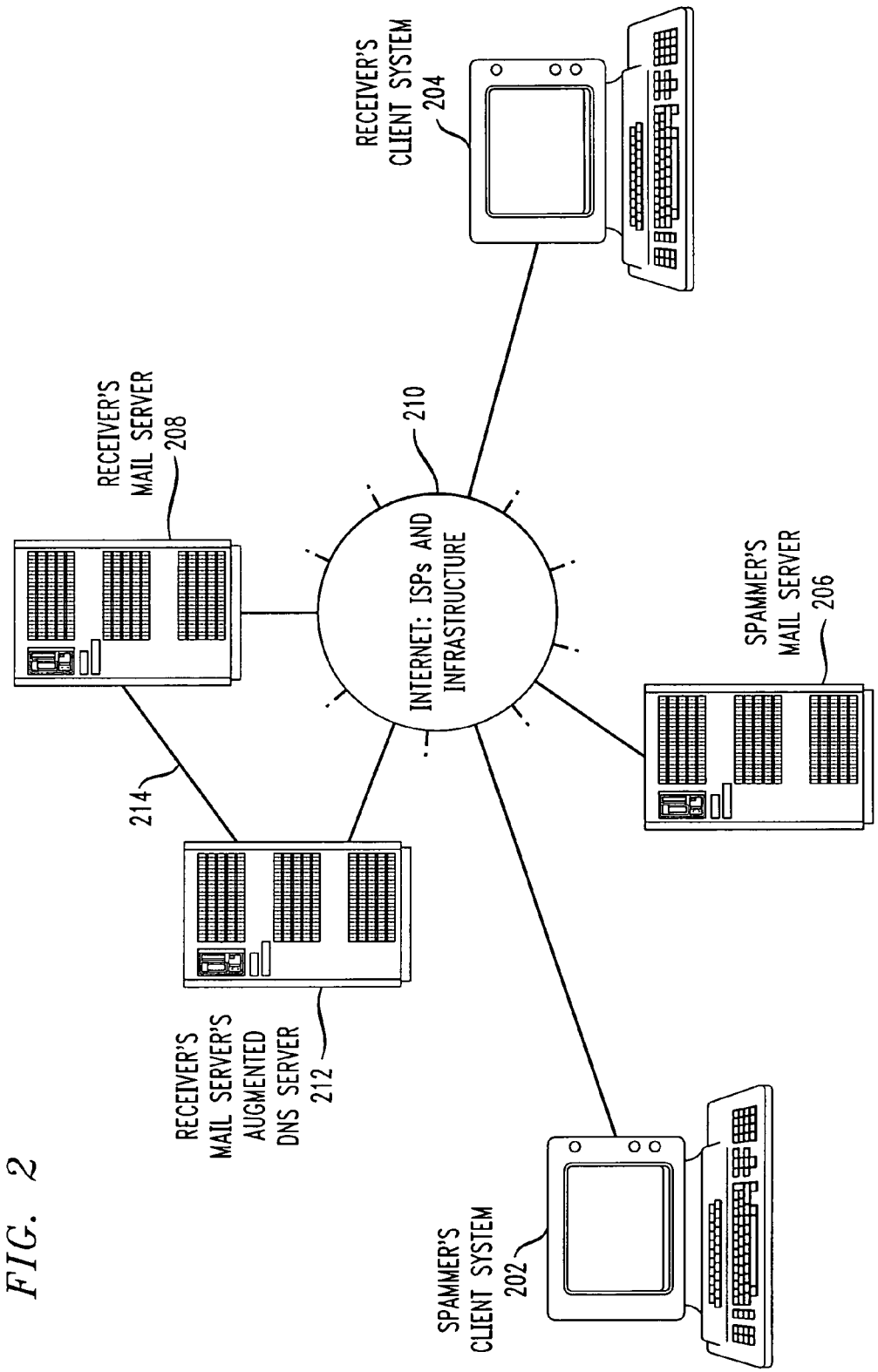
FIG. 2 is a diagram illustrating a network for identifying spam email with an augmented domain name server, according to an embodiment of the present invention.

Referring now to FIG. 2, a diagram illustrates a network for identifying spam email with an augmented domain name server, according to an embodiment of the present invention. A special augmented domain name server (ADNS) 212 is employed to maintain a copy of the Internet domain registry. The registry is comprised of information concerning the ownership, origin date, term ending date and authoritative name servers for domains. ADNS 212 contains this information as entries within a cache. Entries include a flag designating whether the entry details a known spam site and a timestamp that records the first time the DNS entry was recorded. In general, the newer the domain, the more likely it will come under scrutiny as a potential spammer domain. A more detailed description of the functionality of ADNS 212 is provided below in FIG. 4.

In accordance with an embodiment of the present invention, a spam detection flow is described as follows with respect to FIG. 2: The spammer generates spam email at spammer's client system 202 which, as in FIG. 1, is forwarded optionally to an intermediate spammer's mail server 206 via the Internet 210, ultimately reaching receiver's mail server 208. Receiver's mail server 208 performs specialized checking, a more detailed description of which is provided below in FIG. 3, to determine whether the email is likely spam. In so doing, receiver's mail server 208, using a local network 214, may access archived information on ADNS 212. If identified as spam, receiver's client system 204 is spared the inconvenience of receiving spam email because the spam may be sorted into a separate inbox designated for spam or automatically discarded.

Figure 3:
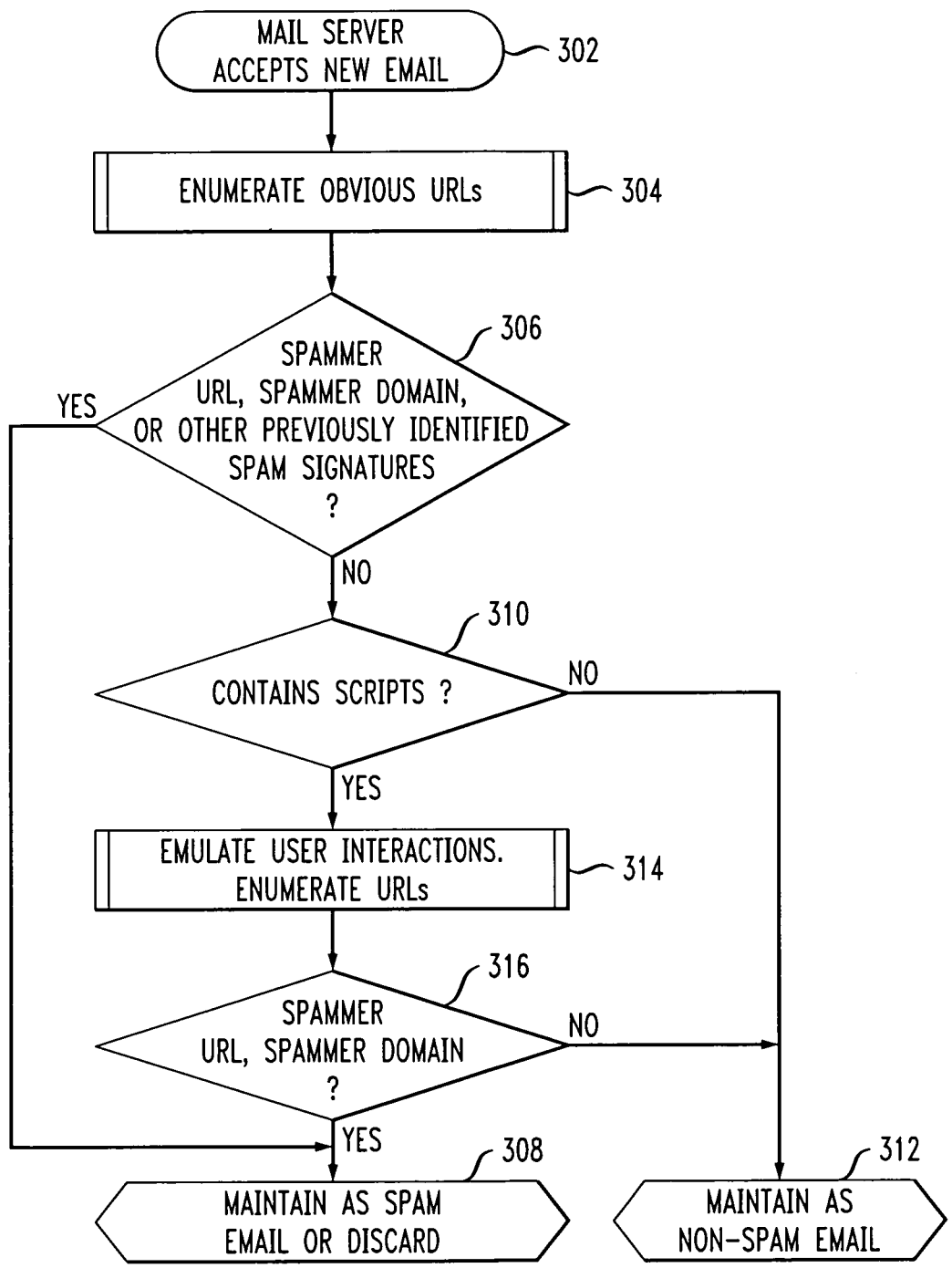
FIG. 3 is a flow diagram illustrating a spam identification methodology, according to an embodiment of the present invention.

Referring now to FIG. 3, a flow diagram illustrates a spam email identification methodology, according to an embodiment of the present invention. In block 302, the mail server accepts a new email. In block 304, the straightforward or obvious uniform resource locators (URLs) are enumerated or reduced to the simply identified domains or explicit Internet Protocol (IP) addresses. These domains and IP addresses can then be referenced either in a maintained cache of know spam entities in accordance with the system of FIG. 1, or by the augmented domain name server in accordance with the system of FIG. 2, in block 306.

The invention is not limited to the maintenance of a dynamic registry or to a local cache. The collection of entries can simply be a "blacklist" of domains and IP addresses known to be spam-ridden. Each entry contains standard information as described above plus the spam flag and the first identified timestamp. A domain as described in this invention is not limited to the base Internet assigned domain. Instead, the domain name may be a "name-dot-domain" extension to an existing domain, because that extension might be the only part that is producing spam. In this description, "domain" will refer to either the Internet domain or an extension referring to an Internet resource. If the domain is found to be in the "blacklist" or the augmented domain name server's cache the determination concerning likelihood of being spam can be obtained. The finding could be the discovery of an extremely new domain entry and although not marked with the spam flag, it might be tentatively marked as spam. In such an application, it would be expected that the receiver would periodically check the separate inbox, provided for spam to validate the results.

Referring back to the methodology of FIG. 3, if the test of block 306 yields a positive spam result, the methodology terminates at block 308 and the email is maintained as spam or discarded. If the test of block 306 yields a negative spam result, it remains possible that a spam email contains hypertext, or a hyperlink, that does not obviously translate to a known spam target URL. In block 310, it is determined if the email contains at least one HTML or other suitable browser-interpretable script. If no such scripts exist, the methodology terminates at block 312, where the email is maintained as non-spam email. If such scripts are found to exist, the methodology continues to block 314 where a succession of user interactions are processed using an apparatus to emulate the end user action via a simulated invocation of the target script to potentially expose more content for verification. If it is determined that any enumerated URLs are spam in block 316, then the email is maintained as spam and the methodology terminates at block 308. Otherwise, the email is maintained as non-spam email and the methodology terminates at block 312.

Figure 4:
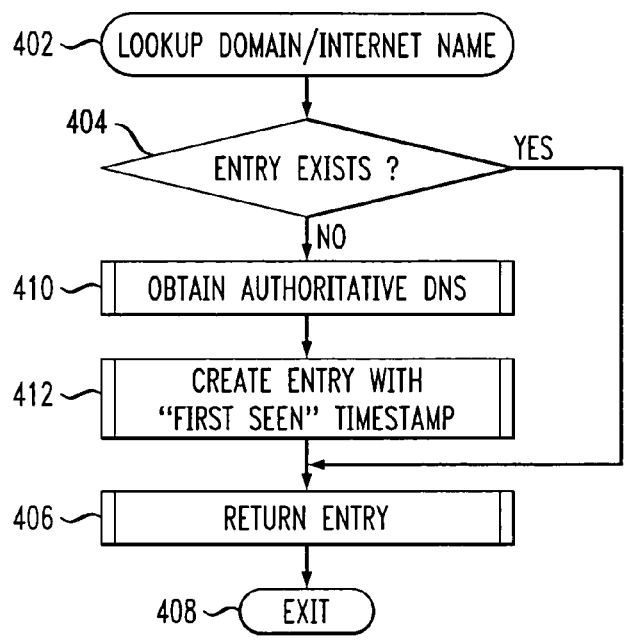
FIG. 4 is a flow diagram illustrating an augmented domain name server entry retrieval methodology, according to an embodiment of the present invention.

Referring now to FIG. 4, a flow diagram illustrates an augmented domain name server entry retrieval methodology, according to an embodiment of the present invention. The process of determining if a URL comes from a spammer domain is performed by requesting a lookup by the ADNS in block 402. In block 404 it is determined if an entry exists. If an entry exists, the entry is found and returned to the caller in block 406 terminating the methodology at block 408. If an entry does not exist, the ADNS will obtain ADNS resource records in block 410 and create a new entry with its spam flag "off" in block 412, before returning same to the caller in block 406 and terminating the methodology in block 408.

Figure 5:
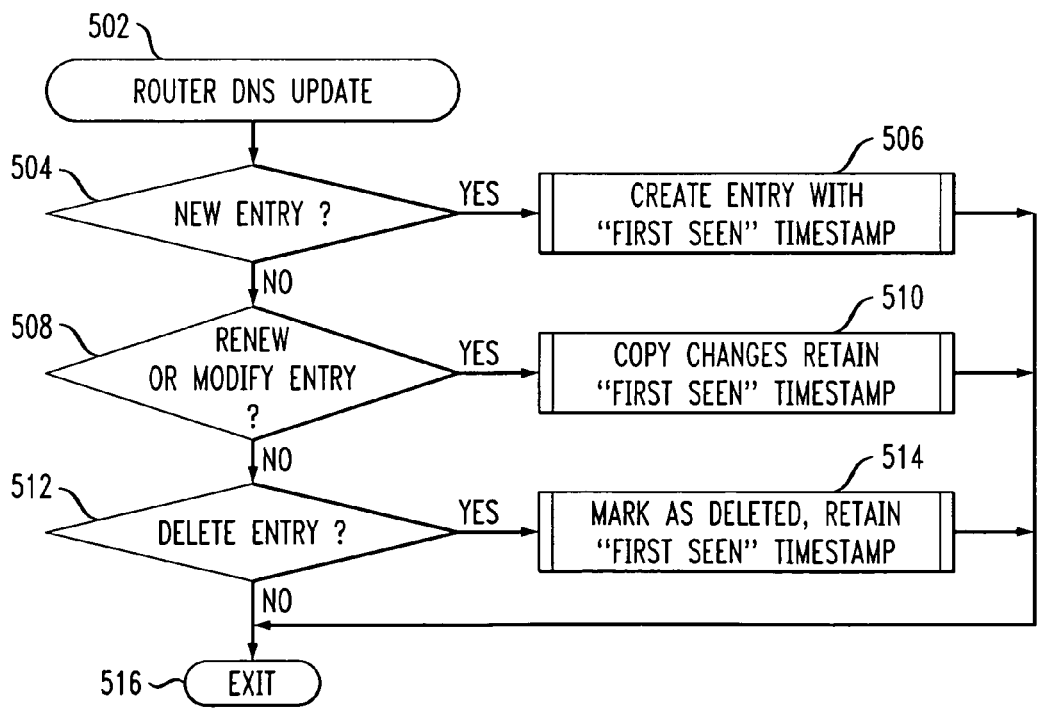
FIG. 5 is a flow diagram illustrating an augmented domain name server organization methodology, according to an embodiment of the present invention.

Referring now to FIG. 5, a flow diagram illustrates an augmented domain name server organization methodology, according to an embodiment of the present invention. The augmented domain name server can be used to maintain a dynamic list of domains. As described previously, data name servers provide information concerning the registry for a domain. Three scenarios are now described below with respect to FIG. 5.

The methodology begins at block 502, where ADNS receives routine DNS information. In block 504, it is determined if the information includes a new entry. If a new entry is included, it is cached along with a "first seen" timestamp in block 506 with the spam flag "off". If a new entry is not included, it is determined if the information includes an update or reactivation of a previously received entry in block

508. If the information includes an update or reactivation, the relevant changes are copied without affecting the "first seen" timestamp in block 510. If the information does not include an update or reactivation, it is determined if the information is for deletion of an entry in block 512. If the information is for deletion, the previously existing cached entry is repopulated but the spam flag and the "first seen" timestamp is not disturbed in block 514. The methodology terminates at block 516, after blocks 506, 510 and 514, or for those updates that are not important to the functioning of the ADNS. The probability that a given entry is filtered out as spam is determined in accordance with the "first seen" timestamp of the entry. More specifically, an entry is weighted higher as probable spam when a "first seen" timestamp is first created. Additionally, an entry is weighted less as probable spam as time passes from the "first seen" timestamp.

Figure 6:
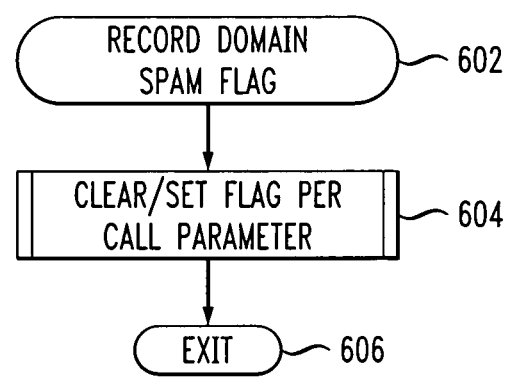
FIG. 6 is a flow diagram illustrating an augmented domain name server spam indication methodology, according to an embodiment of the present invention.

Referring now to FIG. 6, a flow diagram illustrates an augmented domain name server spam indication methodology, according to an embodiment of the present invention. The spam flag may be adjusted by a call to the appropriate service in the ADNS in block 602. The flag is cleared or set in accordance with the call parameter in block 604, and the methodology terminates in block 606. Such update calls may result from receiver feedback through the receiver's mail server. Other updates may occur by agents that collect information from other sources.

Figure 7:
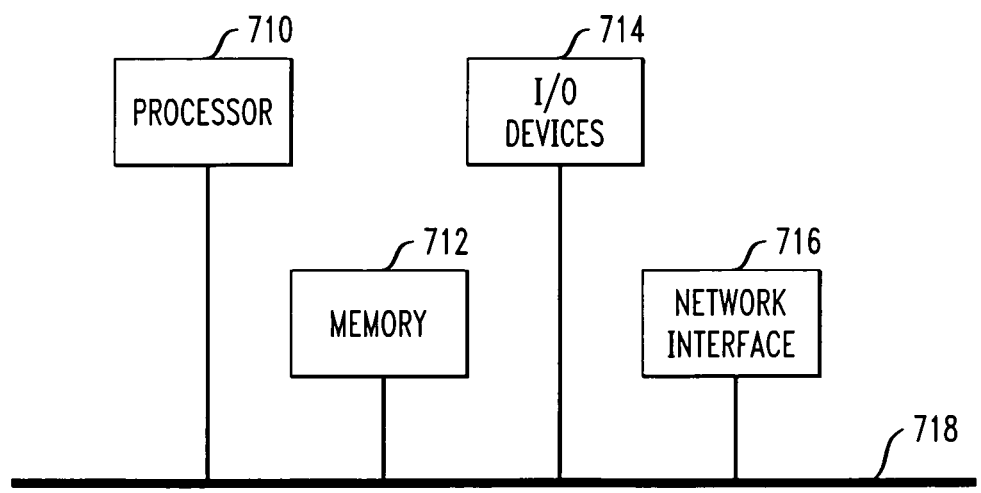
FIG. 7 is a diagram illustrating an illustrative hardware implementation of a computing system in accordance with which one or more components/methodologies of the present invention may be implemented, according to an embodiment of the present invention.

Referring now to FIG. 7, a block diagram illustrates an exemplary hardware implementation of a computing system in accordance with which one or more components/methodologies of the invention (e.g., components/methodologies described in the context of FIGS. 1-6) may be implemented, according to an embodiment of the present invention.

As shown, the computer system may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of classifying received electronic mail (email) comprising the steps of:
    performing at least one initial desirability scan on one or more uniform resource locators (URLs) in a received email, wherein the at least one initial desirability scan focuses on one or more domain names or one or more Internet Protocol addresses associated with the one or more URLs;
    determining if the received email comprises one or more non-HTML browser-interpretable scripts when the received email passes the at least one initial desirability scan, wherein any non-HTML browser-interpretable scripts contained in the received email are separate from the one or more URLs scanned in the at least one initial desirability scan;
    performing a secondary desirability scan on the received email as a function of the one or more non-HTML browser-interpretable scripts when the received email comprises one or more non-HTML browser-interpretable scripts, wherein the secondary desirability scan is adapted to emulate one or more end user actions via a simulated invocation of the one or more non-HTML browser-interpretable scripts contained in the received email, and wherein the simulated invocation of the one or more non-HTML browser-interpretable scripts is adapted to uncover at least one target domain camouflaged within the received email by inclusion of extraneous content within the received email;
    identifying the received email as undesirable email when the received email fails the at least one initial desirability scan, or the received email fails the secondary desirability scan; and
    identifying the received email as desirable email when the received email does not comprise one or more non-HTML browser-interpretable scripts or the received email passes the secondary desirability scan.

2. The method of claim 1, further comprising the step of discarding the undesirable email.

3. The method of claim 1, wherein the step of performing at least one initial desirability scan comprises the steps of:
    identifying the one or more uniform resource locators (URLs) in the received email;
    determining if the one or more URLs are associated with at least one of an undesirable domain name and an undesirable Internet Protocol (IP) address;
    failing the received email when the one or more URLs are associated with the at least one of an undesirable domain name and an undesirable IP address; and
    passing the received email when the one or more URLs are not associated with the at least one of an undesirable domain name and an undesirable IP address.

4. The method of claim 3, wherein the step of determining if the one or more URLs are associated with at least one of an undesirable domain name and an undesirable IP address, comprises the steps of:
    reducing the one or more URLs to at least one of a domain name and an IP address; and
    determining if the one or more reduced URLs match an undesirable domain name or an undesirable IP address from a maintained list of known domain names and IP addresses.

5. The method of claim 4, wherein, in the step of determining if the one or more reduced URLs match an undesirable domain name or an undesirable IP address, the maintained list of known domain names and IP addresses is comprised in a local cache.

6. The method of claim 5, wherein the local cache comprises maintained domain name server data zone transfers and domain name server protocol.

7. The method of claim 4, wherein, in the step of determining if the one or more reduced URLs match an undesirable domain name or an undesirable IP address, the maintained list of known domain names and IP addresses is comprised in an augmented domain name server, wherein the maintained list comprises a list of undesirable domain names and undesirable IP addresses indicated as undesirable by the setting of associated desirability indicators.

8. The method of claim 7, wherein the step of determining if the one or more reduced URLs match an undesirable domain name or an undesirable IP address, comprises the steps of:
   providing the one or more reduced URLs to the augmented domain name server;
   determining if an entry exists in the augmented domain name server matching the one or more reduced URLs;
   creating at least one entry matching the one or more reduced URLs when an entry does not exits in the augmented domain name server; and
   returning an entry having one of the desirability indicators when the entry exists in the augmented domain name server.

9. The method of claim 8, wherein the step of creating an entry further comprises the step of providing a creation timestamp with the entry.

10. The method of claim 8, wherein, in the step of returning an entry, the one of the desirability indicators comprises a flag designating a state of the entry as the entry pertains to undesirable origination.

11. The method of claim 8, wherein, in the step of returning an entry, the one of the desirability indicators is determined in accordance with a creation timestamp of the entry.

12. The method of claim 1, wherein the step of performing a secondary desirability scan comprises the steps of:
   simulating an invocation of each of the one or more non-HTML browser-interpretable scripts;
   determining if content exposed from each simulation is associated with at least one of an undesirable domain name and an undesirable IP address;
   failing the received email when the content is associated with the at least one of an undesirable domain name and an undesirable IP address; and
   passing the received email when the content is not associated with the at least one of an undesirable domain name and an undesirable IP address.

13. The method of claim 12, wherein, in the step of simulating an invocation, a receiver of the received email is protected from effects when invoking each of the one or more non-HTML browser-interpretable scripts.

14. The method of claim 12, wherein the step of determining if the content exposed from each simulation is associated with at least one of an undesirable domain name and an undesirable IP address, comprises the steps of:
   reducing the content to at least one of a domain name and an IP address; and
   determining if the reduced content matches an undesirable domain name or an undesirable IP address from a maintained list of known domain names and IP addresses.

15. The method of claim 14, wherein, in the step of determining if the reduced content matches an undesirable domain name or an undesirable IP address, the maintained list of known domain names and IP addresses is comprised in a local cache.

16. The method of claim 14, wherein, in the step of determining if the reduced content matches an undesirable domain name or an undesirable IP address, the maintained list of known domain names and IP addresses is comprised in an augmented domain name server.

17. The method of claim 16, wherein the step of determining if the reduced content matches an undesirable domain name or an undesirable IP address, comprises the steps of:
   providing the reduced content to the augmented domain name server;
   determining if an entry exists in the augmented domain name server matching the reduced content;
   creating an entry matching the reduced content when an entry does not exist in the augmented domain name server; and
   returning an entry having a desirability indicator when the entry exists in the augmented domain name server.

18. The method of claim 1, wherein at least one of the at least one initial desirability scan and the secondary desirability scan is adapted to determine if the received email is associated with an entry in an augmented domain name server, the entry comprising:
   (i) a desirability indicator determined in accordance with a creation timestamp of the entry, and
   (ii) at least one of an undesirable domain name and an undesirable Internet Protocol (IP) address, wherein the desirability indicator of the entry comprises a weight indicative of a probability that an email determined to be associated with the entry is undesirable email, and wherein the weight is decreased as time increases from the time of the creation timestamp such that the entry becomes less likely to pertain to undesirable origination as time increases from the time of the creation timestamp.

19. The method of claim 18 further comprising the steps of:
   receiving an update to the augmented domain name server;
   determining if the update comprises a new entry for the augmented domain name server;
   creating a new entry in the augmented domain name server comprising a new entry creation timestamp and a new entry desirability indicator when the update comprises a new entry for the augmented domain name server, wherein the new entry desirability indicator comprises a weight indicative of a probability that an email determined to be associated with the new entry is undesirable email; and
   modifying or deleting an existing entry on the augmented domain name server when the update does not comprise a new entry for the augmented domain name server.

20. The method of claim 19, wherein the step of modifying or deleting an existing entry comprises:
   determining if the update comprises a modification of the existing entry when the update does not comprise a new entry for the augmented domain name server;
   modifying the existing entry and retaining a creation timestamp of the existing entry when the update comprises a modification of the existing entry;
   determining if the update comprises a deletion of the existing entry when the update does not comprise a modification of the existing entry; and marking the existing entry as deleted and retaining the creation timestamp of the existing entry when the update comprises a deletion of the existing entry.

21. The method of claim 19, wherein a likelihood of the new entry pertaining to undesirable origin is determined in accordance with the new entry creation timestamp.

22. The method of claim 21, wherein the new entry is less likely to pertain to the undesirable origination as time increases from the new entry creation timestamp.

23. The method of claim 19, wherein the new entry is assigned a sufficiently high weight that any email associated with the new entry is designated as undesirable email.

24. The method of claim 18, wherein the secondary desirability scan is adapted to emulate one or more end user actions via a simulated invocation of the one or more non-HTML browser-interpretable scripts contained in the received email adapted to uncover at least one target domain camouflaged within the received email by inclusion of extraneous content within the received email.

25. The method of claim 24, wherein the received email is determined to be associated with the entry in the augmented domain name server when at least one of the one or more URLs and the at least one target domain is associated with the at least one of an undesirable domain name and an undesirable IP address of the entry.

26. The method of claim 18, wherein the weight of the entry is indicative of a probability that the at least one of an undesirable domain name and an undesirable IP address of the entry pertains to undesirable origination.

27. Apparatus for classifying received electronic mail (email), comprising:
    a memory; and
    at least one processor coupled to the memory and operative to:
    (i) perform at least one initial desirability scan on one or more uniform resource locators (URLs) in a received email, wherein the at least one initial desirability scan focuses on one or more domain names or one or more Internet Protocol addresses associated with the one or more URLs;
    (ii) determine if the received email comprises one or more non-HTML browser-interpretable scripts when the received email passes the at least one initial desirability scan, wherein any non-HTML browser-interpretable scripts contained in the received email are separate from the one or more URLs scanned in the at least one initial desirability scan;
    (iii) perform a secondary desirability scan on the received email as a function of the one or more non-HTML browser-interpretable scripts when the received email comprises one or more non-HTML browser-interpretable scripts, wherein the secondary desirability scan is adapted to emulate one or more end user actions via a simulated invocation of the one or more non-HTML browser-interpretable scripts contained in the received email, and wherein the simulated invocation of the one or more non-HTML browser-interpretable scripts is adapted to uncover at least one target domain camouflaged within the received email by inclusion of extraneous content within the received email;
    (iv) identify the received email as undesirable email when the received email fails the at least one initial desirability scan, or the received email fails the secondary desirability scan; and
    (v) identify the received email as desirable email when the received email does not comprise one or more non-HTML browser-interpretable scripts or the received email passes the secondary desirability scan.

28. An article of manufacture for classifying received electronic mail (email), comprising a non-transitory computer readable storage medium containing one or more programs which when executed implement the steps of:
    performing at least one initial desirability scan on one or more uniform resource locators (URLs) in a received email, wherein the at least one initial desirability scan focuses on one or more domain names or one or more Internet Protocol addresses associated with the one or more URLs;
    determining if the received email comprises one or more non-HTML browser-interpretable scripts when the received email passes the at least one initial desirability scan, wherein any non-HTML browser-interpretable scripts contained in the received email are separate from the one or more URLs scanned in the at least one initial desirability scan;
    performing a secondary desirability scan on the received email as a function of the one or more non-HTML browser-interpretable scripts when the received email comprises one or more non-HTML browser-interpretable scripts, wherein the secondary desirability scan is adapted to emulate one or more end user actions via a simulated invocation of the one or more non-HTML browser-interpretable scripts contained in the received email, and wherein the simulated invocation of the one or more non-HTML browser-interpretable scripts is adapted to uncover at least one target domain camouflaged within the received email by inclusion of extraneous content within the received email;
    identifying the received email as undesirable email when the received email fails the at least one initial desirability scan, or the received email fails the secondary desirability scan; and
    identifying the received email as desirable email when the received email does not comprise one or more non-HTML browser-interpretable scripts or the received email passes the secondary desirability scan.

\* \* \* \* \*